Patented May 23, 1933

1,909,991

UNITED STATES PATENT OFFICE

ADOLF WEIHE, OF EILENBURG, AND OTTO JORDAN AND LEO KOLLEK, OF MANNHEIM, GERMANY, ASSIGNORS TO I. G. FARBENINDUSTRIE AKTIENGESELLSCHAFT OF FRANKFORT-ON-THE-MAIN, GERMANY

PRODUCTION OF ARTIFICIAL MASSES AND COATINGS THEREFROM

No Drawing. Application filed November 8, 1929, Serial No. 405,840, and in Germany November 20, 1928.

The present invention relates to the production of artificial masses and coatings therefrom.

It has been common practice to comminute cellulose nitrate in the presence of water in order to avoid the risk of explosion, and to then displace the water from the nitrocellulose with alcohol or another organic solvent in order to render the nitrocellulose compatible with organic solvents and organic ingredients, such as plasticizers and the like and permit the production of homogeneous solutions therewith. A considerable number of the solvents and plasticizers are, however, very liable to ignition and usually emit disagreeable odors and vapors. Moreover the solvents are usually lost when the preparations are applied as coatings.

We have found that artificial masses and coatings therefrom having valuable properties when applied to a great variety of substrata, such as, for example, leather, paper, metals, asbestos, wood, webs, artificial materials, brickwork and the like, are obtained in a simple manner by mechanically dispersing water-insoluble cellulose derivatives in water and mixing the finely divided aqueous dispersions with aqueous emulsions of assistants i. e. of solvents, softening agents or gelatinizing agents or mixtures of same, and then applying the preparations which contain, at most, small quantities of volatile solvents to the substrata, the coatings thus obtained after drying being subjected, if desired, to an after treatment.

The aqueous dispersions of the finely divided water-insoluble cellulose derivatives employed may be prepared in any suitable manner, for example, by grinding the cellulose derivatives in a suitable mill with or without the addition of soluble or insoluble dyestuffs, fillers and the like or by dissolving them in suitable solvents and reprecipitating them by means of non-solvents, for example, water, the products being subsequently ground, if desired, or by converting them into a gelatinized mass and comminuting the mass by wet grinding. In all cases dyestuffs, fillers and the like may be present. It is recommended that the cellulose derivatives be employed in the finest and most uniform form possible, in particular, in a form in which they are as free as possible from fibrous and coarse constituents, which state may be obtained by a treatment of the cellulose derivatives by means of friction rollers with subsequent grinding in a mill with or without additions of other substances. As suitable cellulose derivatives may be mentioned, for example, nitrocelluloses cellulose carboxylates, such as, acetyl celluloses and other cellulose esters, water-insoluble cellulose ethers and the like.

The aqueous emulsions of the assistants, the solvents, the gelatinizing or softening agents or mixtures of the same, which are to be employed, should be as finely dispersed and as stable as possible and are preferably prepared with the employment of protective colloids, for example gelatine, glue, methyl cellulose or other water soluble carbohydrate derivatives, polymerized vinyl alcohol, water soluble condensation products of a urea and formaldehyde and the like, or the so-called wetting or emulsifying agents, for example, alkyl naphthalene sulphonic acid salts, soaps, resin soaps and the like or mixtures of the said substances. Soluble or insoluble organic or inorganic coloring materials, resins, such as condensation products of cyclohexanone, colophony, gum dammar from which the wax has been removed, and the like conventional additions may also be added before preparing the aqueous emulsion of the assistants. Coal tar dyestuff pigments, such as, lakes or water-insoluble metal salts of the dyestuffs may be employed in the form of powders or aqueous pastes.

When mixing the aqueous dispersions of the cellulose derivatives with the said emulsions, care should be taken that the preparations remain heterogeneous which means that the emulsions are added to the mixtures in amounts which are insufficient to cause gelatinization, and that on the other hand the formation of lumps is avoided. The amounts to be added are, in particular, dependent on the degree of the solvent or gelatinizing power of the assistants for the cellulose derivatives, on the fineness of the emulsion, and on the nature and the quantity of the protective colloids, dyestuffs, fillers and other ingredients employed. For example, in the simultaneous presence of pigment dyestuffs, fillers and the like the amounts of the gelatinizing agent or solvent may frequently be greater than in the absence of the said substances without causing the occurrence of gelatinization or the formation of lumps. The most satisfactory amounts and the greatest amounts which are permissible differ, but may readily be ascertained in each case by a small experiment easily accomplished without any special means.

The formation of the mixtures of the dispersions of the cellulose derivatives and the said emulsions may be effected by simple mixing while stirring, but frequently the emulsions may be added to the aqueous dispersions of the cellulose derivatives at the beginning or in the course of the grinding of the same.

The mixtures obtained may be brought into any desired condition. The preparations containing considerable proportions of water and liquid ingredients are suitable for spraying, immersing, printing or painting and may be applied to the substrata in any suitable manner corresponding to their form. The masses containing small quantities of liquid ingredients are easily shaped without the application of considerable heat and/or pressure.

After drying, the coatings may be then subjected to a subsequent treatment. For example, they may be varied by the application of solvents or lacquers by means of spraying, immersing or painting or by heating to a moderate temperature such as about 60° to 80° C. or by employing pressure. The simultaneous employment of moderate heat and pressure, or a spraying over with solvents with a subsequent treatment with pressure and/or heat, for example by passage through a hot calender roller, is frequently to be recommended.

Coatings having valuable properties may be prepared on a great variety of substrata with the aid of the process according to this invention. In particular the said mixtures may serve as body colors for leather and also, for the production of coatings and lacquerings of all kinds for leather, split leather and similar substrata and further for the preparation of waterproof coatings on paper, such as wall papers and the like. The mixtures may also be employed for the manufacture of priming compositions applicable by spraying, painting or knifing and of covering coatings on metals, wood, asbestos, brickwork and the like, in which case it is, generally speaking, preferable to apply them by spraying or painting or with a printing machine.

Iron substrata should preferably be previously primed in a suitable manner to prevent the formation of rust, and the other substrata may frequently be primed or treated with priming compositions in a suitable manner. After subsequent drying of one or several coatings and, if desired, after mechanical smoothing, it is preferable to carry out an after treatment with solvents or lacquers, for example with cellulose derivative lacquers, so that the treated surfaces may be adapted to correspond to the requirements.

The following examples will further illustrate the nature of this invention, but the invention is not restricted to these examples. The parts are by weight.

*Example 1*

A mass obtained from 50 parts of nitrocellulose, 100 parts of water and 20 parts of Lithol fast scarlet RN paste (cf. G. Schultz, Farbstofftabellen, 1923, No. 73) by rolling with the aid of friction rollers and subsequent grinding in a mill is mixed with an emulsion of about 30 parts of butyl stearate and about 15 parts of dibutyl phthalate and, if desired, from 2 to 5 parts of a resin prepared by condensation of cyclohexanone, in a mixture of about 5 parts of methyl-cellulose in from about 50 to 100 parts of water and applied preferably three times to chrome-tanned leather after further diluting, for example, with water. After subsequent drying the leather is sprayed over with a solvent, for example ethyl acetate, and is passed through a moderately hot calender roller. The coating obtained has good properties and may be burnished.

The proportions employed may be varied and other dyestuffs may also be employed. The application may also be effected onto a leather which has been treated with a colorless or colored nitrocellulose lacquer. The dry coating may also be sprayed over with a suitable nitrocellulose lacquer.

Coatings on paper may be obtained in a similar manner, and these may find employment for example for the preparation of water-proof wallpapers.

*Example 2*

An aqueous dispersion obtained by intimately mixing 100 parts of a 40 per cent aqueous paste of benzyl cellulose which contains 5 per cent of methyl cellulose, 10 parts of a pigment dyestuff, for example Lithol fast scarlet RN powder, and an emulsion of 20 parts of dibutyl phthalate in about 0.75 part of methyl cellulose, 0.75 part of the sodium salt of a butylated naphthalene sulphonic acid and 20 parts of water, is applied with a paint-brush onto metal, wood, brickwork and the like. After drying an elastic non bending coating is obtained.

Onto this coating, if desired after mechanical smoothing, a nitrocellulose lacquer, for example a solution of nitrocellulose, esterified colophony and tricresyl phosphate in a mixture of butyl acetate, butanol, the acetate of ethylene glycol monoethyl ether, benzene and ethyl alcohol may be sprayed or painted.

*Example 3*

50 parts of an approximately from 25 to 30 per cent aqueous nitrocellulose paste prepared by rolling with the aid of friction rollers and subsequent grinding in a mill are mixed with 15 parts of chalk, 15 parts of lithopone, 30 parts of slate meal, 15 parts of talc or graphite and further with 25 parts of an emulsion which has been obtained from 0.8 part of the sodium salt of a butylated naphthalene sulphonic acid, 0.8 part of methyl cellulose, 40 parts of water, 19.5 parts of butyl stearate, 19.5 parts of dibutyl phthalate and 19.4 parts of a synthetic resin obtained from cyclohexanone.

A thick paste is obtained which, after dilution with water, may be employed as a priming composition, for example for coating wood.

The dried coatings, if desired, after mechanical smoothing by grinding or polishing, which may also be carried out in the absence of water and of organic liquids, and, if desired, after treatment with solvents, may be coated with a paste prepared according to Example 1 or with a nitrocellulose covering lacquer or the like by painting or spraying, and still further coatings may then be applied if desired.

*Example 4*

50 parts of nitrocellulose are wetted with from 50 to 100 parts of water and then passed at room temperature from 5 to 10 times between the closely arranged rolls of a friction roller mill until the cellulose nitrate has lost any fibrous structure. The thin foils obtained are ground together with 100 parts of a 10 per cent aqueous solution of methyl cellulose in a ball mill and the paste obtained is mixed with 50 parts of an emulsion which contains 0.8 per cent of the sodium salt of a butylated naphthalene sulphonic acid, 0.8 per cent of methyl cellulose, 50 per cent of water, 32 per cent of butyl stearate, 10 per cent of butyl phthalate and 6.4 per cent of a synthetic resin, for example obtained from cyclohexanone, and with 8 parts of Lithol fast scarlet RN powder.

The mass obtained may be employed as a painting lacquer and may be painted onto untreated wood or onto wood which has been primed in a suitable manner, by means of a paint brush. After drying, an after treatment with solvents may be carried out or a cellulose derivative lacquer, for example a nitrocellulose lacquer may be applied.

*Example 5*

25 parts of nitrocellulose are comminuted and dispersed, as described in the foregoing examples, together with 55 parts of water and 20 parts of ochre, whereupon the paste obtained is intimately mixed with an emulsion of 25 parts of dibutyl phthalate in 100 parts of a 5 per cent aqueous solution of methyl cellulose. The preparation obtained is suitable for application by spraying.

*Example 6*

25 parts of nitrocellulose are comminuted and dispersed, as described in the foregoing examples, together with 55 parts of water and 120 parts of a filler such as lithopone, slate meal or talcum and the like, whereupon 200 parts of the paste obtained are intimately mixed with an emulsion of 25 parts of tricresyl phosphate in 30 parts of a 5 per cent aqueous solution of methyl cellulose. The preparation obtained is suitable for use as a primer.

*Example 7*

25 parts of nitrocellulose are comminuted and dispersed, as described in the foregoing examples, together with 55 parts of water and 20 parts of an earth color, such as iron red, ochre or the like, whereupon 100 parts of the paste obtained are intimately mixed with 45 parts of an emulsion of 40 parts of castor oil and 5 parts of tributyl phosphate in 120 parts of a 5 per cent aqueous solution of methyl cellulose. The preparation obtained is suitable for painting fabrics.

What we claim is:—

1. The process for the production of artificial masses and coatings therefrom, which comprises mechanically dispersing a water-insoluble, solid cellulose derivative in water and incorporating the aqueous dispersion with an aqueous emulsion of an assistant in a quantity insufficient for dissolving said cellulose derivative.

2. The process for the production of artificial masses and coatings therefrom, which comprises mechanically dispersing a water-insoluble, solid cellulose derivative in water until it has lost any fibrous structure and incorporating the aqueous dispersion with an aqueous emulsion of an assistant in a quantity insufficient for dissolving said cellulose derivative.

3. The process for the production of artificial masses and coatings therefrom, which comprises mechanically dispersing a water-insoluble, solid cellulose derivative in water and incorporating the aqueous dispersion with an aqueous emulsion of an assistant, in a quantity insufficient for dissolving said cellulose derivative and containing a protective colloid.

4. The process for the production of artificial masses and coatings therefrom, which comprises mechanically dispersing a water-insoluble, solid cellulose derivative in water and incorporating the aqueous dispersion obtained with an aqueous emulsion of an assistant, in a quantity insufficient for dissolving said cellulose derivative and containing a protective colloid, applying the preparation obtained onto a substratum and covering it with another coating.

5. The process for the production of artificial masses and coatings therefrom, which comprises mechanically dispersing a water-insoluble solid cellulose derivative in a considerable quantity of water and incorporating the aqueous dispersion with an aqueous emulsion of a quantity of a gelatinizing agent insufficient for dissolving said cellulose derivative.

6. The process for the production of artificial masses and coatings therefrom, which comprises mechanically dispersing a water-insoluble solid cellulose derivative in a considerable quantity of water and incorporating the aqueous dispersion with an aqueous emulsion of a quantity of a gelatinizing and a softening agent insufficient for dissolving said cellulose derivative.

7. The process for the production of artificial masses and coatings therefrom, which comprises mechanically dispersing a water-insoluble solid cellulose derivative in a considerable quantity of water and incorporating the aqueous dispersion with an aqueous emulsion of a quantity of a gelatinizing and a softening agent and of an organic solvent insufficient for dissolving said cellulose derivative.

In testimony whereof we have hereunto set our hands.

ADOLF WEIHE.
OTTO JORDAN.
LEO KOLLEK.